US012563637B2

(12) United States Patent
Yang et al.

(10) Patent No.:    US 12,563,637 B2
(45) Date of Patent:        Feb. 24, 2026

(54) DISCONTINUOUS RECEPTION IN WIRELESS COMMUNICATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/468,471

(22) Filed: Sep. 15, 2023

(65) Prior Publication Data

US 2024/0129998 A1      Apr. 18, 2024

Related U.S. Application Data

(60) Provisional application No. 63/380,036, filed on Oct. 18, 2022.

(51) Int. Cl.
*H04W 76/28*          (2018.01)
*H04W 72/1268*      (2023.01)

(52) U.S. Cl.
CPC ....... *H04W 76/28* (2018.02); *H04W 72/1268* (2013.01)

(58) Field of Classification Search
CPC .. H04W 76/28; H04W 72/1268; H04W 72/23
See application file for complete search history.

(56) References Cited

U.S. PATENT DOCUMENTS

2021/0037473 A1*    2/2021  Liu ....................... H04W 76/28

* cited by examiner

*Primary Examiner* — Ayanah S George
(74) *Attorney, Agent, or Firm* — Arent Fox Schiff LLP

(57)                        ABSTRACT

Receiving, from a base station in radio resource control (RRC) connected mode with the UE and prior to an expiration of a drx-InactivityTimer of a medium access control (MAC) entity of the UE, a MAC control element (CE) command for the MAC entity to enter a discontinuous reception (DRX) cycle, the command including an layer 2 (L2) uplink (UL) grant, wherein DRX comprises an ability for the UE to transmit a response to the command via the L2 UL grant, the response comprising one of acceptance of the command and rejection of the command. Determining the response to the command. Transmitting, to the base station using the L2 UL grant, the determined response. Operating according to the transmitted response.

30 Claims, 12 Drawing Sheets

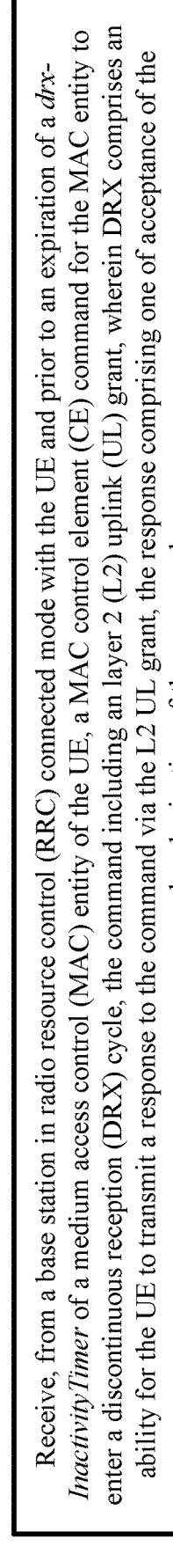

Receive, from a base station in radio resource control (RRC) connected mode with the UE and prior to an expiration of a *drx-InactivityTimer* of a medium access control (MAC) entity of the UE, a MAC control element (CE) command for the MAC entity to enter a discontinuous reception (DRX) cycle, the command including an layer 2 (L2) uplink (UL) grant, wherein DRX comprises an ability for the UE to transmit a response to the command via the L2 UL grant, the response comprising one of acceptance of the command and rejection of the command.
510

Determine the response to the command.
520

Determine the response based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE.
522

Transmit, to the base station using the L2 UL grant, the determined response.
530

Operate according to the transmitted response.
540

Figure 7:
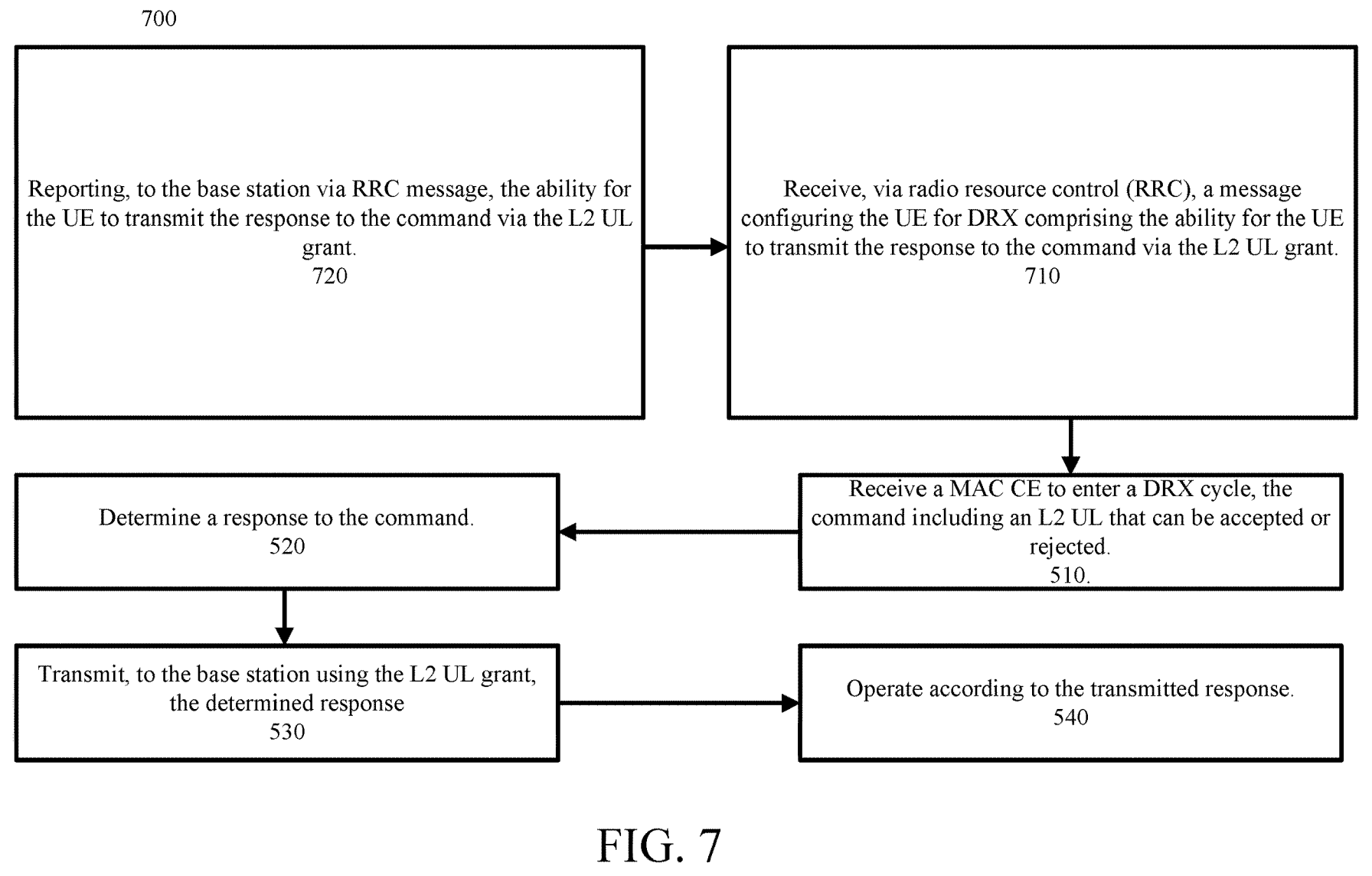

Receive, via radio resource control (RRC), a message configuring the UE for DRX comprising the ability for the UE to transmit the response to the command via the L2 UL grant.
710

Reporting, to the base station via RRC message, the ability for the UE to transmit the response to the command via the L2 UL grant.
720

Receive a MAC CE to enter a DRX cycle, the command including an L2 UL that can be accepted or rejected.
510.

Determine a response to the command.
520

Transmit, to the base station using the L2 UL grant, the determined response
530

Operate according to the transmitted response.
540

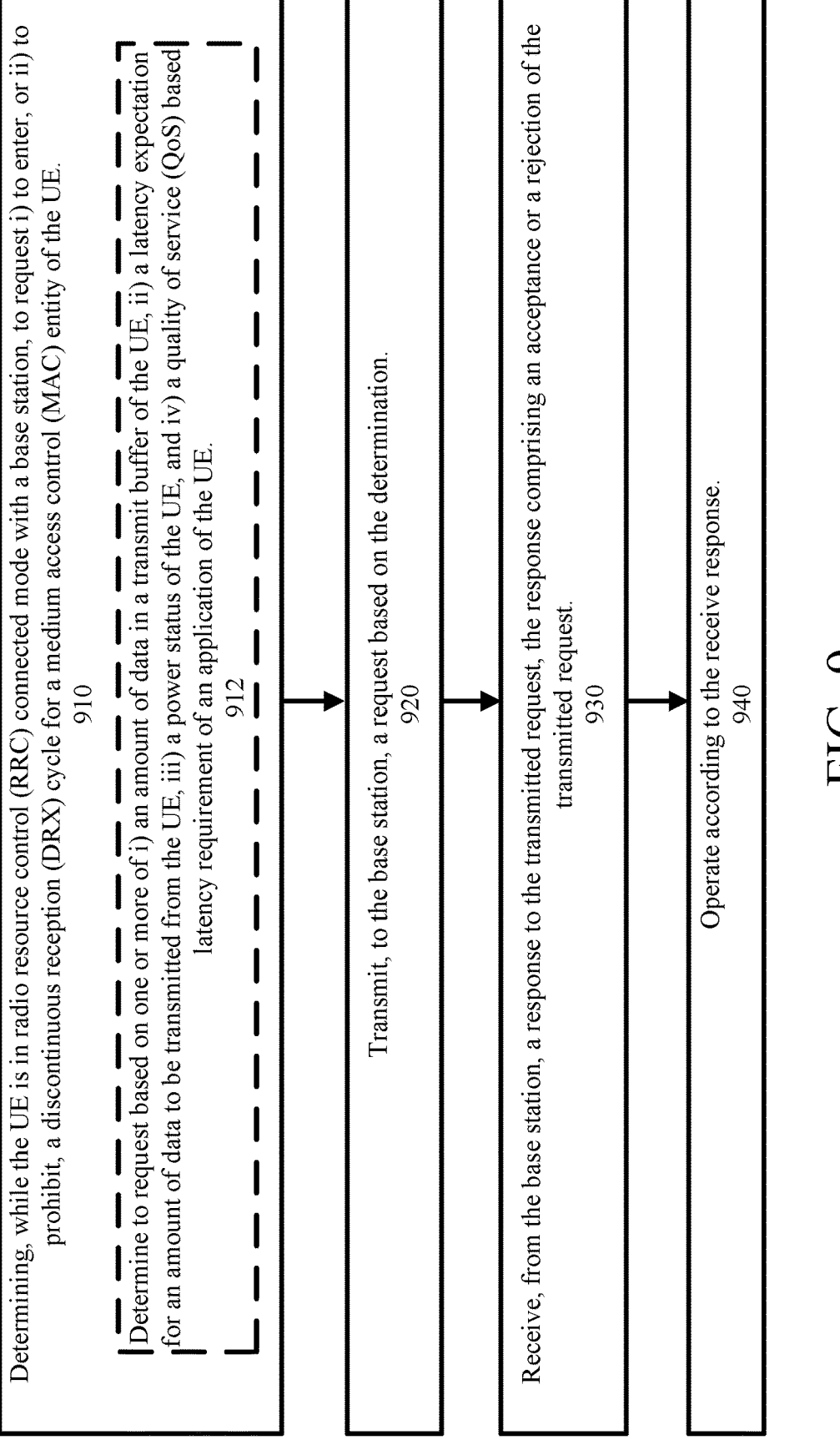

Determining, while the UE is in radio resource control (RRC) connected mode with a base station, to request i) to enter, or ii) to prohibit, a discontinuous reception (DRX) cycle for a medium access control (MAC) entity of the UE.
910

Determine to request based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE.
912

Transmit, to the base station, a request based on the determination.
920

Receive, from the base station, a response to the transmitted request, the response comprising an acceptance or a rejection of the transmitted request.
930

Operate according to the receive response.
940

DISCONTINUOUS RECEPTION IN WIRELESS COMMUNICATION

TECHNICAL FIELD

The present disclosure relates generally to communication systems, and more particularly in some examples to discontinuous reception in wireless communication systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eM10), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a wireless communication method in a user equipment (UE), including: receiving, from a base station in radio resource control (RRC) connected mode with the UE and prior to an expiration of a drx-InactivityTimer of a medium access control (MAC) entity of the UE, a MAC control element (CE) command for the MAC entity to enter a discontinuous reception (DRX) cycle, the command including an layer 2 (L2) uplink (UL) grant, wherein DRX includes an ability for the UE to transmit a response to the command via the L2 UL grant, the response including one of acceptance of the command and rejection of the command; determining the response to the command; transmitting, to the base station using the L2 UL grant, the determined response; and operating according to the transmitted response.

In some aspects, the techniques described herein relate to a wireless communication method in a UE, including: determining, while the UE is in RRC connected mode with a base station, to request i) to enter, or ii) to prohibit, a DRX cycle for a MAC entity of the UE; transmitting, to the base station a request based on the determination; receiving, from the base station, a response to the transmitted request, the response including an acceptance or a rejection of the transmitted request; and operating according to the received response.

In some aspects, the techniques described herein relate to a wireless communication method in a base station, including: transmitting, to a UE in RRC connected mode with the base station and prior to an expiration of a drx-InactivityTimer of a MAC entity of the UE, a MAC CE command for the MAC entity to enter a DRX cycle, the transmitted command including an L2 UL grant, wherein DRX includes an ability for the UE to transmit a response to the command via the L2 UL grant, the response including one of acceptance of the command and rejection of the command; receiving, from the UE via the L2 UL grant, the response; and operating according to the received response.

In some aspects, the techniques described herein relate to a wireless communication method in a base station, including: receiving, from a UE in RRC connected mode with the base station, a request i) to enter, or ii) to prohibit, a DRX cycle for a MAC entity of the UE; determining a response to the received request, the response including an acceptance or a rejection of the received request; transmitting the determined response; and operating according to the transmitted response.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a flow diagram illustrating methods of wireless communication, in accordance with examples of the technology disclosed herein.

FIG. 7 is a flow diagram illustrating methods of wireless communication, in accordance with examples of the technology disclosed herein.

FIG. 9 is a flow diagram illustrating methods of wireless communication, in accordance with examples of the technology disclosed herein.

Figure 10:
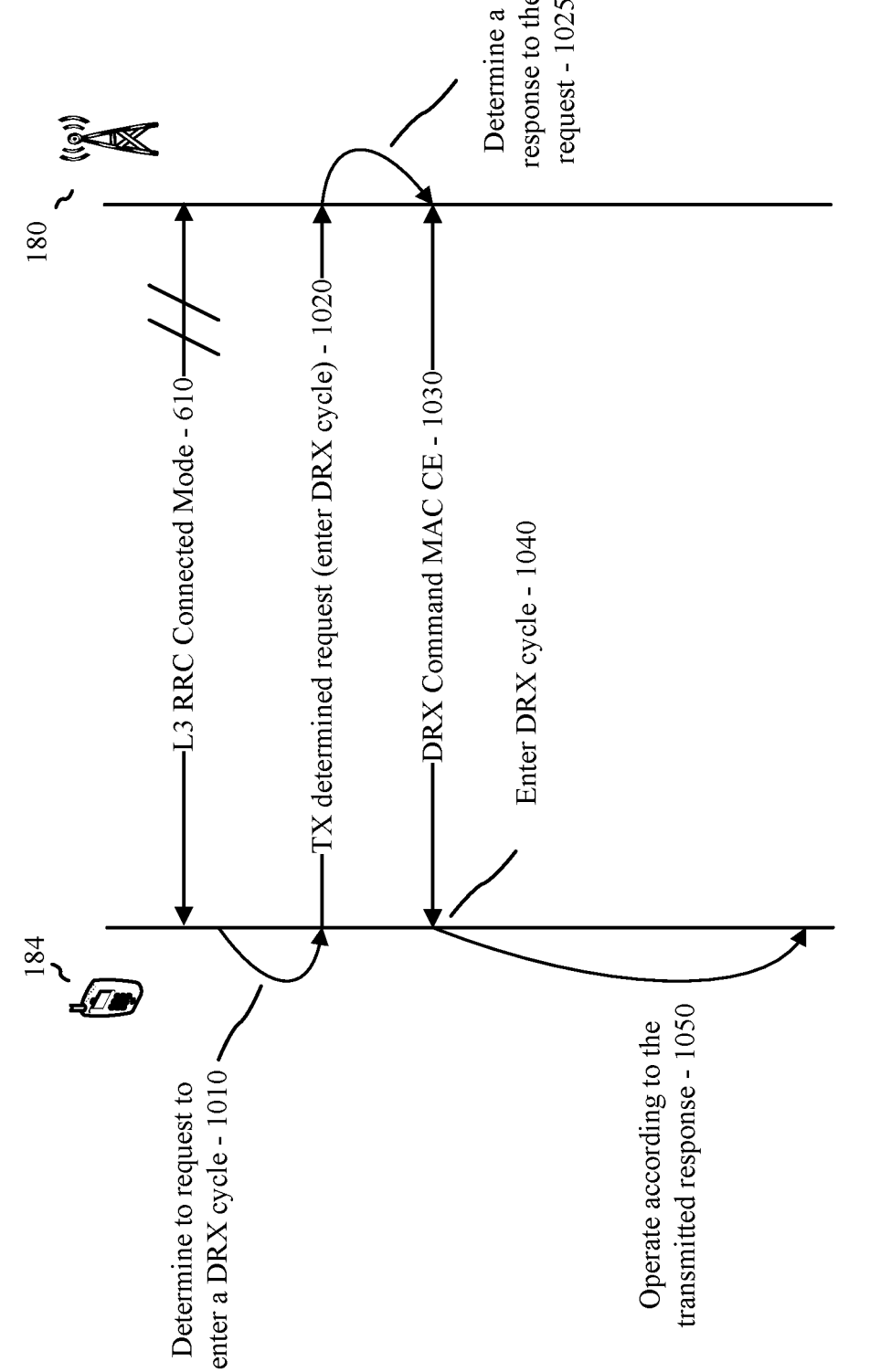

FIG. 10 illustrates a message flow, in accordance with examples of the technology disclosed herein.

Figure 11:
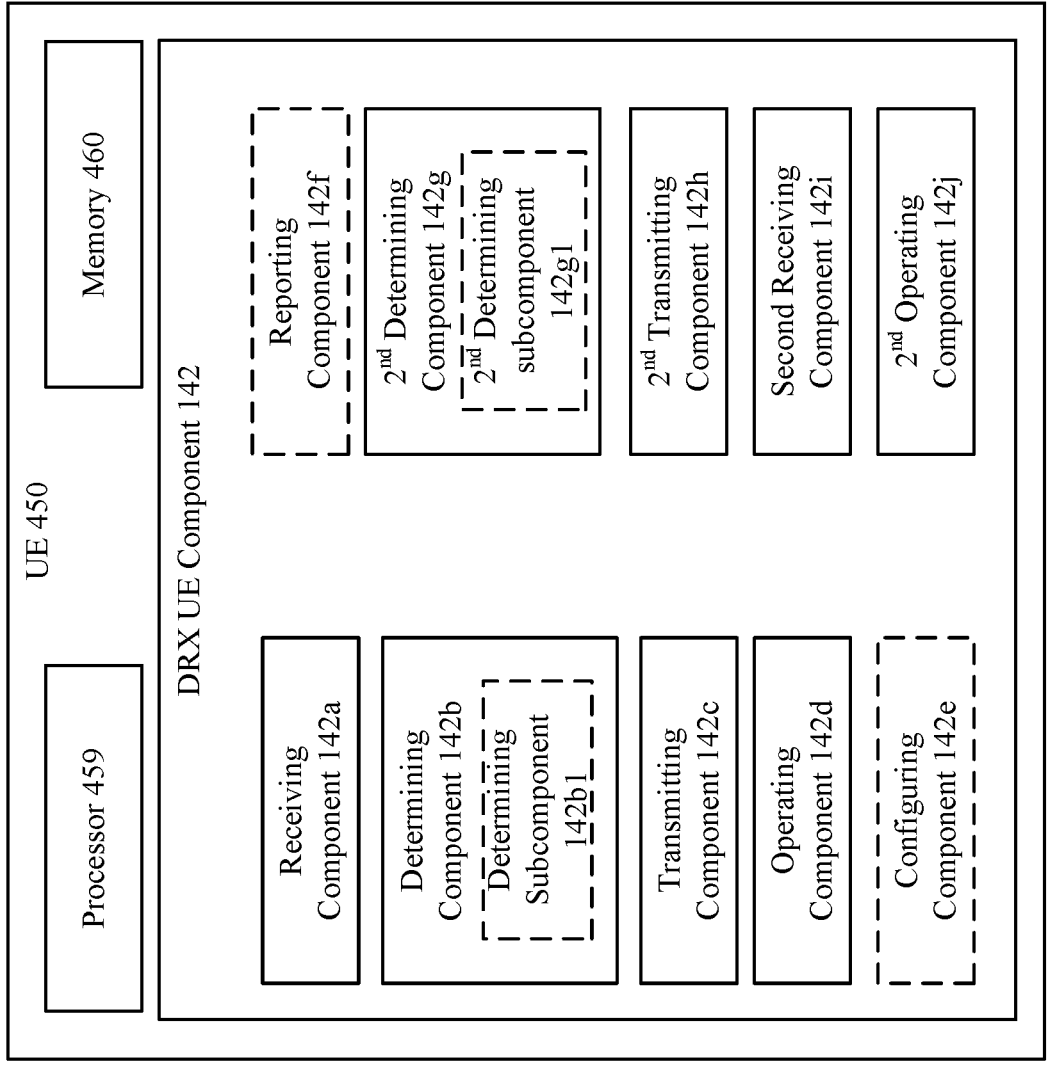

FIG. 11 is a block diagram of a UE, in accordance with examples of the technology disclosed herein.

Figure 12:
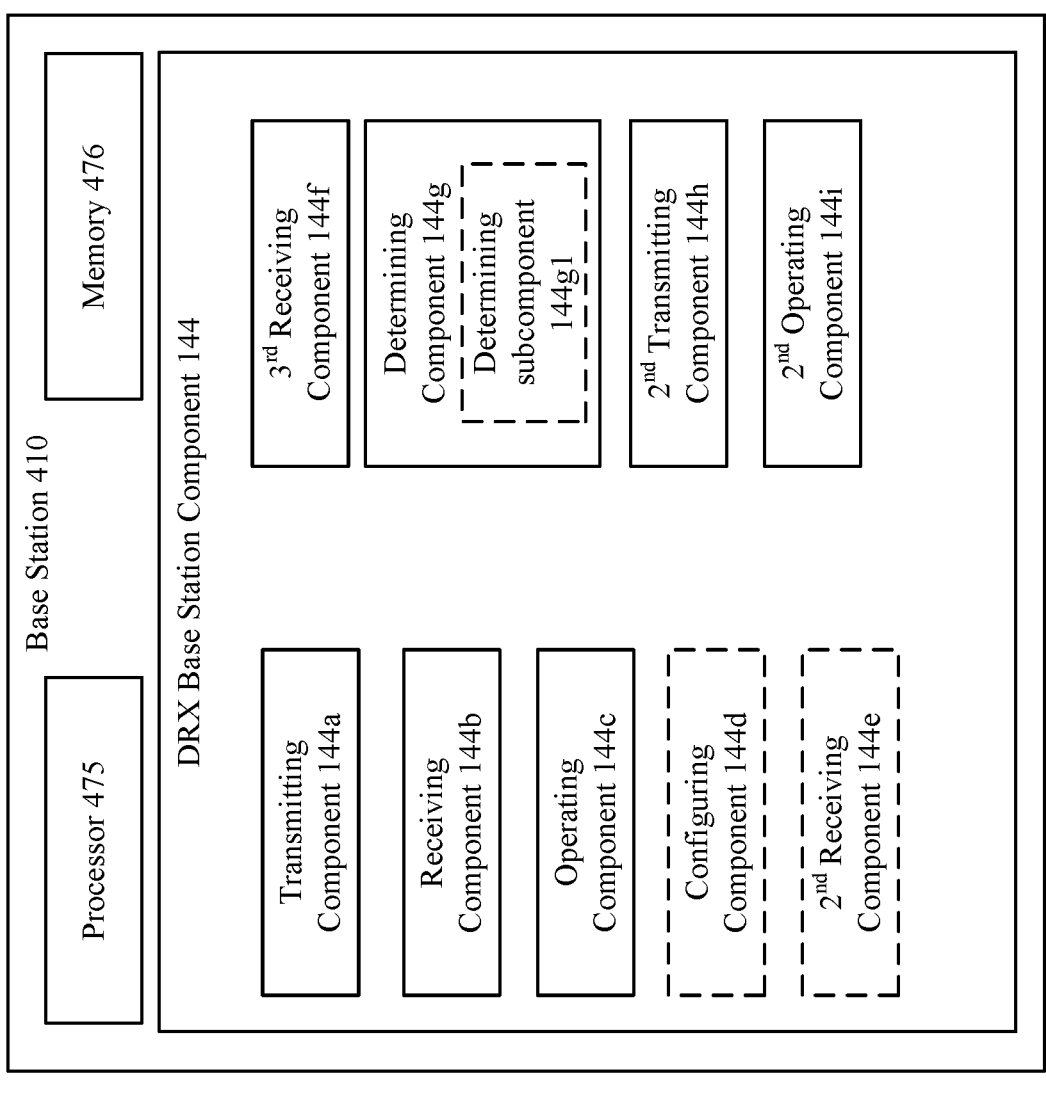

FIG. 12 is a block diagram of a base station, in accordance with examples of the technology disclosed herein.

Appendix A illustrates examples of the technology disclosed herein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Discontinuous reception (DRX) is a set of wireless communication capabilities used primarily in user equipment (UE) (e.g., a smartphone) of a wireless communications network. In DRX as practiced in a 5G NR wireless communication network, a UE listens for downlink (DL) transmissions from one or more transmission reception points (TRPs) (e.g., of a base station of the wireless network) for some number of "slots" of a DRX cycle, and then the UE disables its receiver for the remainder of slots in the DRX cycle. Typically, the DRX has a low duty cycle, i.e., there are substantially fewer listening slots than not listening slots in a DRX cycle. This typically results in i) less power consumption by the UE, and ii) less power consumption and bandwidth congestion at a connected base station attributable to that UE. Typically, DRX capability operation in a UE is configured by a base station using Radio Resource Control (RRC) in layer 3 (L3) of the 5G protocol stack.

One of several triggers for a UE to enter a DRX cycle is expiration of an RRC-configured timer, drx-InactivityTimer, from the last slot with a receive PDCCH transmission. Another trigger in the UE, effective even during a potentially long period until the drx-InactivityTimer expires, is receipt of a layer 2 (L2) DRX Command media access control command element (MAC CE) or an L2 Long DRX Command MAC CE. Each of DRX Command MAC CE and Long DRX Command MAC CE triggers a DRX cycle independent of the drx-InactivityTimer.

However, a UE receiving a DRX Command MAC CE or a Long DRX Command MAC CE does not have the chance to reject a command to enter a DRX cycle. Entering a DRX cycle can be disadvantageous to the UE in some situations. For example, if the UE has data in a transmit buffer of the UE, then the UE would have to wait until the next listening slot(s) of the DRX cycle. Such a wait can increase latency in a manner that degrades the user-perceived throughput.

Further, the UE could be facing a low-power situation without the need to transmit any low latency data—a situation where entry into a DRX cycle could be advantageous. However, the applicable standards do not provide for the UE to request entry into a DRX cycle before drx-InactivityTimer expires. Conversely, the UE cannot request to prohibit entry into a DRX cycle.

In addition, a layer 1 (L1) hybrid automatic repeat request (HARQ) command acknowledgement (ACK/NACK) from the UE to the base station to provide the base station with feedback that a DRX Command MAC CE or a Long DRX Command MAC CE was received may be unreliable—especially in weak RF situations.

The technology disclosed herein is applicable to mitigating one or more of the problems described above. In some examples of the technology disclosed herein, a command (such as DRX Command MAC CE or Long DRX Command MAC CE) from a base station for a UE to enter into a DRX cycle includes an L2 UL grant. The UE can use the L2 UL grant to respond with acceptance, delayed acceptance, or rejection of the command. The UE can determine its response to the command based on one of more of an amount of data in a transmit buffer of the UE, a latency expectation for an amount of data to be transmitted from the UE, a power status of the UE, and a quality of service (QoS) based latency requirement of an application of the UE. Such a determination can be made using one or more of artificial intelligence or machine learning. The UE can use L2 to signal to a base station that the UE has the above-described capabilities. The base station also can use L2 to configure a capable UE for operation using those capabilities.

In some examples of the technology disclosed herein, the UE can request, of a base station in connected RRC mode, to enter or to prohibit entry into a DRX cycle for MAC entity of the UE. After transmitting this request to the base station and receiving a response accepting the request (e.g., a DRX Command MAC CE, a Long DRX Command MAC CE, an acknowledgement of prohibition), the UE can enter/prohibit in accordance with the received response from the base station.

In other examples of the technology disclosed herein, a base station can transmit a MAC CE command for a MAC entity of a UE in RRC connected mode with the base station to enter a DRX cycle, e.g., a DRX Command MAC CE or a Long DRX Command MAC CE. The transmitted command includes an L2 UL grant. In this case, DRX includes the ability for the UE to transmit a response to the command via the L2 UL grant. The response is one of acceptance of the command, a delayed acceptance of the command, and rejection of the command. The base station then operates in accordance with the response.

In some such examples, prior to transmitting the MAC CE command, the base station can transmit, via RRC to the UE, a message configuring the UE for DRX comprising the ability of the UE to transmit the response to the command via the L2 UL grant. In some such examples, prior to the transmitting the configuration command, the base station can receive, from the UE via RRC message, an indication of the ability of the UE to transmit the response to the command via the L2 UL grant.

In some examples, the base station receives, from a UE in radio resource control RRC connected mode with the base station, a request i) to enter, or ii) to prohibit, a DRX cycle for a MAC entity of the UE. in such examples, the base station can determine a response to the received request. The response can include an acceptance or a rejection of the received request. The base station then transmits the determined response and operates according to the transmitted response.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
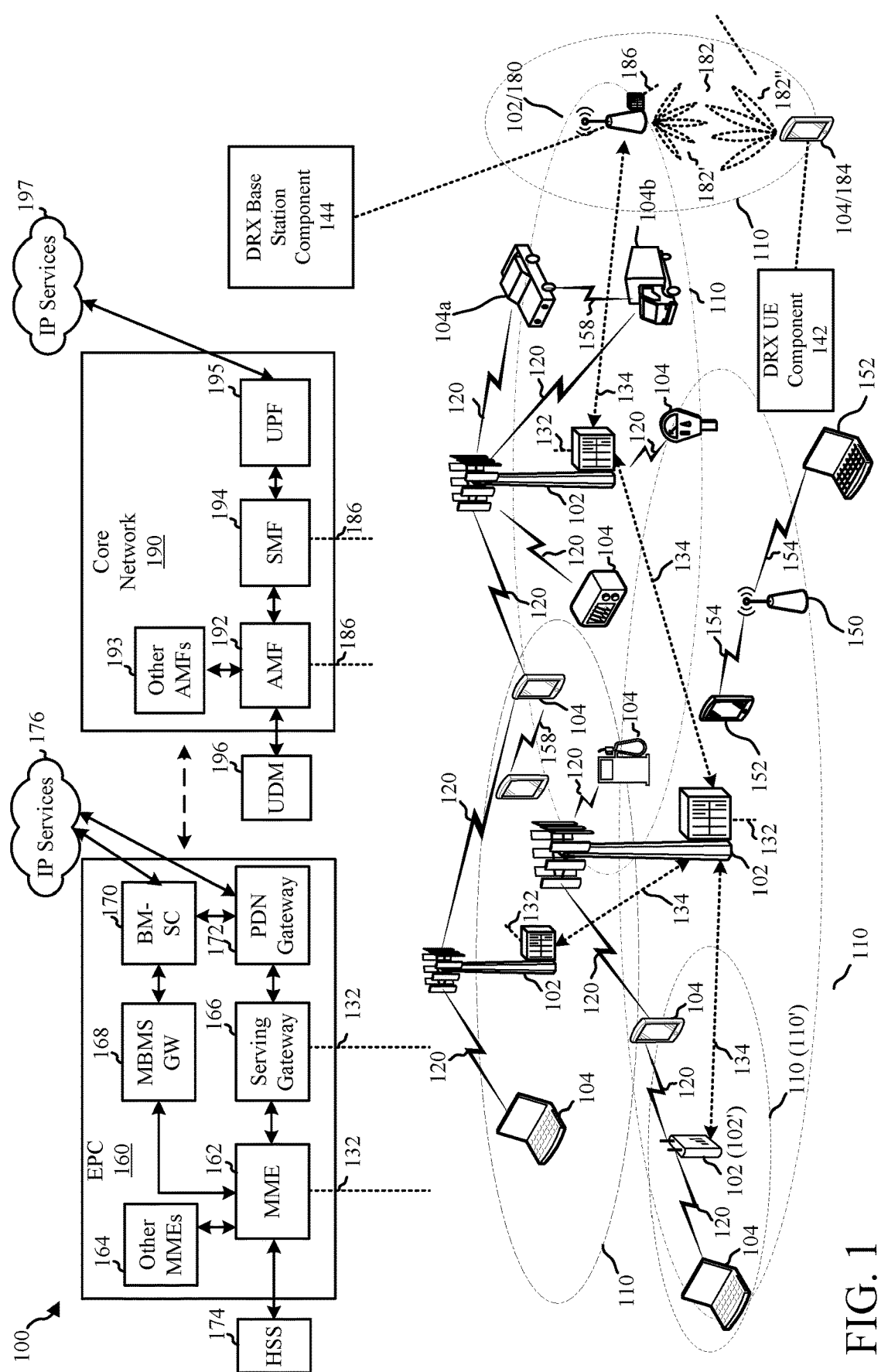
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point 150 (AP 150) in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short-range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180 and UE 104/184. The transmit and receive directions for the base station 180 may or may not be the same. The transmit and receive directions for the UE 104/184 may or may not be the same.

In some examples of the technology disclosed herein, DRX UE component 142 can (in conjunction with other components of UE 104/184) receive a command from a base station 102/180 for a UE 104/184 to enter into a DRX cycle. The command includes an L2 UL grant. The DRX UE component 142 can use the L2 UL grant to respond with acceptance, delayed acceptance, or rejection of the command. The DRX UE component 142 can determine its response to the command based on one of more of an amount of data in a transmit buffer of the UE 104/184, a latency expectation for an amount of data to be transmitted from the UE 104/184, a power status of the UE 104/184, and a quality of service (QoS) based latency requirement of an application of the UE 104/184. Such a determination can be made using one or more of artificial intelligence or machine learning. The DRX UE component 142 can use L2 to signal to a base station 102/180 that the UE 104/184 has the above-described capabilities. The base station 102/180 also can use L2 to configure a capable UE 104/184 for operation using those capabilities.

In some examples of the technology disclosed herein, the DRX UE component 142 can request, of a base station 102/180 in connected RRC mode, to enter/prohibit entry into a DRX cycle for MAC entity of the UE 104/184. After transmitting this request to the base station 102/180 and receiving a response accepting the request (e.g., a DRX Command MAC CE, a Long DRX Command MAC CE), the UE 104/184 can enter/prohibit in accordance with the received response from the base station 102/180.

In other examples of the technology disclosed herein, a DRX base station component 144 of base station 102/180 can transmit a MAC CE command for a MAC entity of a UE 104/184 in RRC connected mode with the base station 102/180 to enter a DRX cycle, e.g., a DRX Command MAC CE or a Long DRX Command MAC CE. The transmitted command includes an L2 UL grant. In this case, DRX includes the ability for the UE 104/184 to transmit a response to the command via the L2 UL grant. The response is one of acceptance of the command, a delayed acceptance of the command, and rejection of the command. The base station 102/180 then operates in accordance with the response.

In some such examples, prior to transmitting the MAC CE command, the DRX base station component 144 can transmit, via RRC to the UE 104/184, a message configuring the UE 104/184 for DRX comprising the ability of the UE to transmit the response to the command via the L2 UL grant. In some such examples, prior to the transmitting the configuration command, the base station DRX base station component 144 can receive, from the UE 104/184 via RRC message, an indication of the ability of the UE 104/184 to transmit the response to the command via the L2 UL grant.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
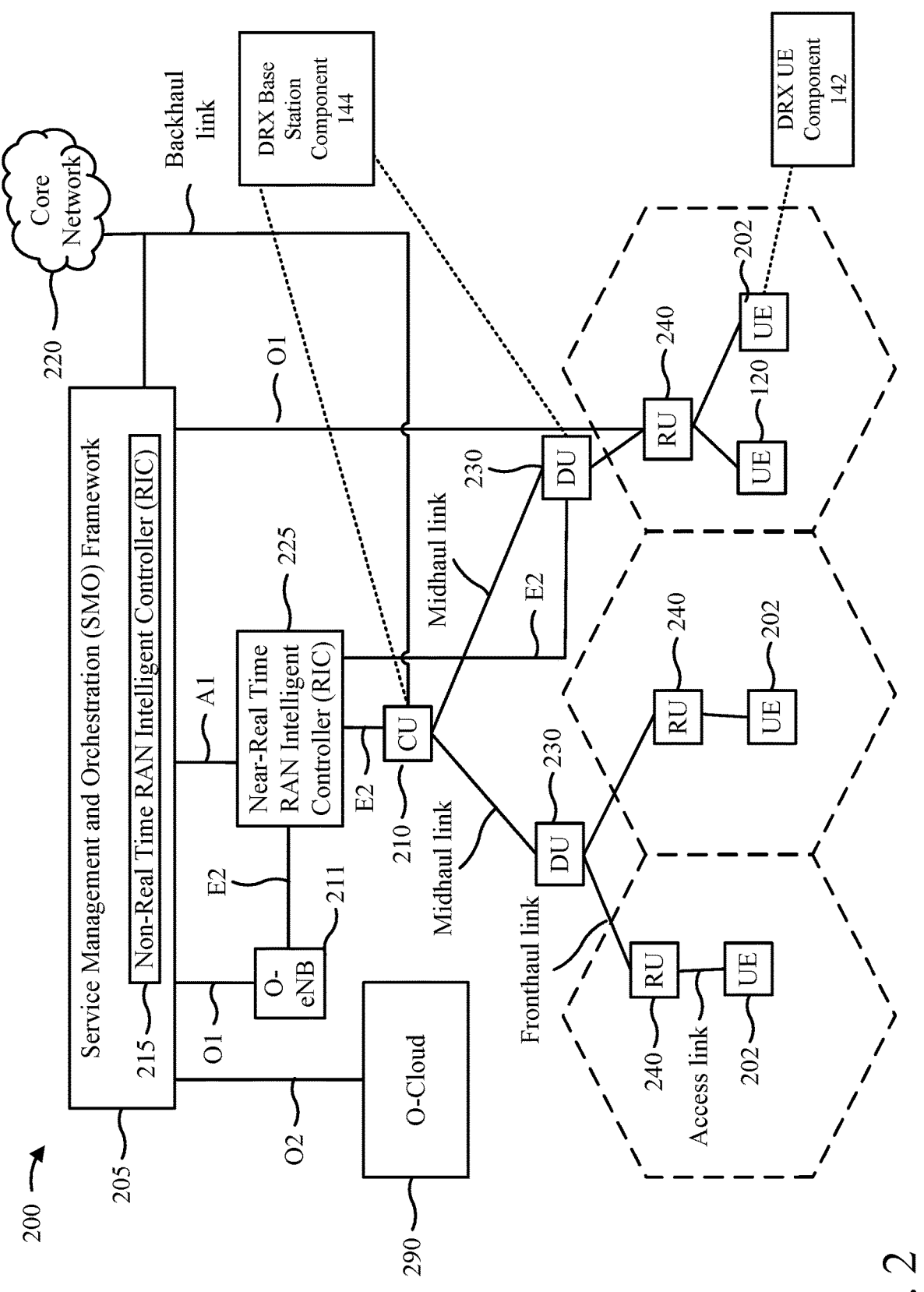
FIG. 2 is a diagram illustrating an example disaggregated base station architecture

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective mid-haul links, such as an F1 interface. The DUs 230 may communicate with one or more radio units (RUs) 240 via respective fronthaul links. The RUs 240 may communicate with respective UEs 202 via one or more radio frequency (RF) access links. In some implementations, the UE 202 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 202. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some examples of the technology disclosed herein, DRX UE component 142 (executing on UE 202) can receive a command from DU 230 for a UE 202 to enter into a DRX cycle includes an L2 UL grant. The DRX UE component 142 can use the L2 UL grant to respond with acceptance, delayed acceptance, or rejection of the command. The DRX UE component 142 can determine its response to the command based on one of more of i) an amount of data in a transmit buffer of the UE 202, ii) a latency expectation for an amount of data to be transmitted from the UE 202, iii) a power status of the UE 202, and iv) a quality of service (QoS) based latency requirement of an application of the UE 202. The DRX UE component 142 can use L2 to signal to DU 230 that the UE 202 has the above-described capabilities. The DU 230 also can use L2 to configure a capable UE 202 for operation using those capabilities.

In some examples of the technology disclosed herein, the DRX UE component 142 can request, of DU 230 in connected RRC mode, to enter or to prohibit entry into a DRX cycle for MAC entity of the UE 202. After transmitting this request to the DU 230 and receiving a response accepting the request (e.g., a DRX Command MAC CE, a Long DRX Command MAC CE), the UE 202 can enter/prohibit in accordance with the received response from the DU 230.

In other examples of the technology disclosed herein, a DRX base station component 144 of DU 230 (in conjunction with controller/processor 475 and memory 476) can transmit a MAC CE command for a MAC entity of a UE 202 in RRC connected mode with the DU 230 to enter a DRX cycle, e.g., a DRX Command MAC CE or a Long DRX Command MAC CE. The transmitted command includes an L2 UL grant. In this case, DRX includes the ability for the UE 202 to transmit a response to the command via the L2 UL grant. The response is one of acceptance of the command, a delayed acceptance of the command, and rejection of the command. The DU 230 then operates in accordance with the response.

In some such examples, prior to transmitting the MAC CE command, the DRX base station component 144 can transmit executing in CU 210, via radio resource control (RRC) to the UE 202, a message configuring the UE 202 for DRX comprising the ability of the UE to transmit the response to the command via the L2 UL grant. In some such examples, prior to the transmitting the configuration command, the DRX base station component 144 can receive, from the UE 202 via RRC message, an indication of the ability of the UE 202 to transmit the response to the command via the L2 UL grant.

Figures 3A, 3B, 3C, 3D:
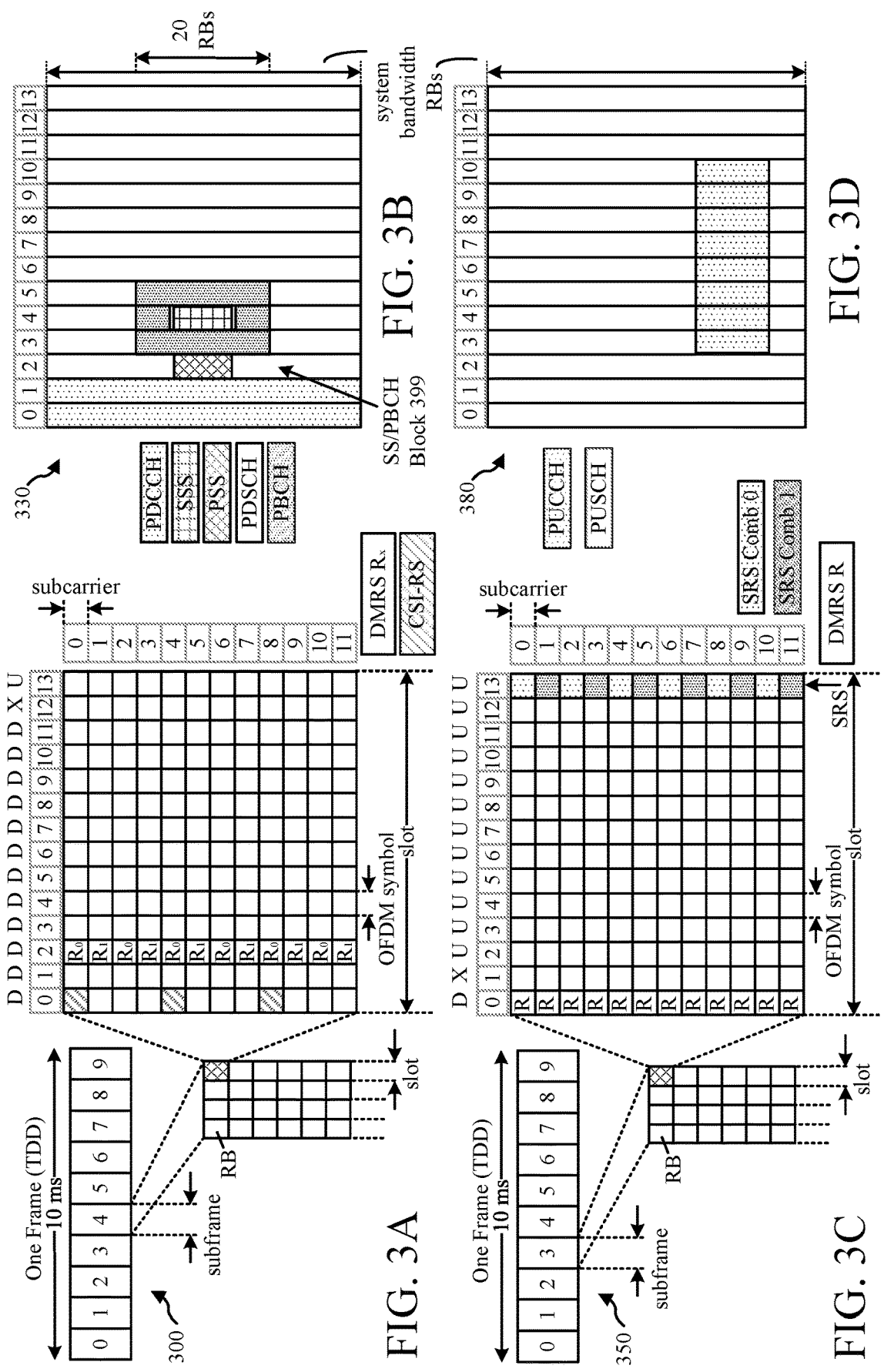
FIG. 3A, FIG. 3B, FIG. 3C, and FIG. 3D are diagrams illustrating examples of a first 5G/NR frame, DL channels within a 5G/NR subframe, a second 5G/NR frame, and UL channels within a 5G/NR subframe, respectively.

FIG. 3A is a diagram 300 illustrating an example of a first subframe within a 5G/NR frame structure. FIG. 3B is a diagram 330 illustrating an example of DL channels within a 5G/NR subframe. FIG. 3C is a diagram 350 illustrating an example of a second subframe within a 5G/NR frame structure. FIG. 3D is a diagram 380 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative ACK (NACK) feedback. The PUSCH carries data and may additionally be used to carry a buffer status report (BSR), a power headroom report (PHR), and/or UCI.

Figure 4:
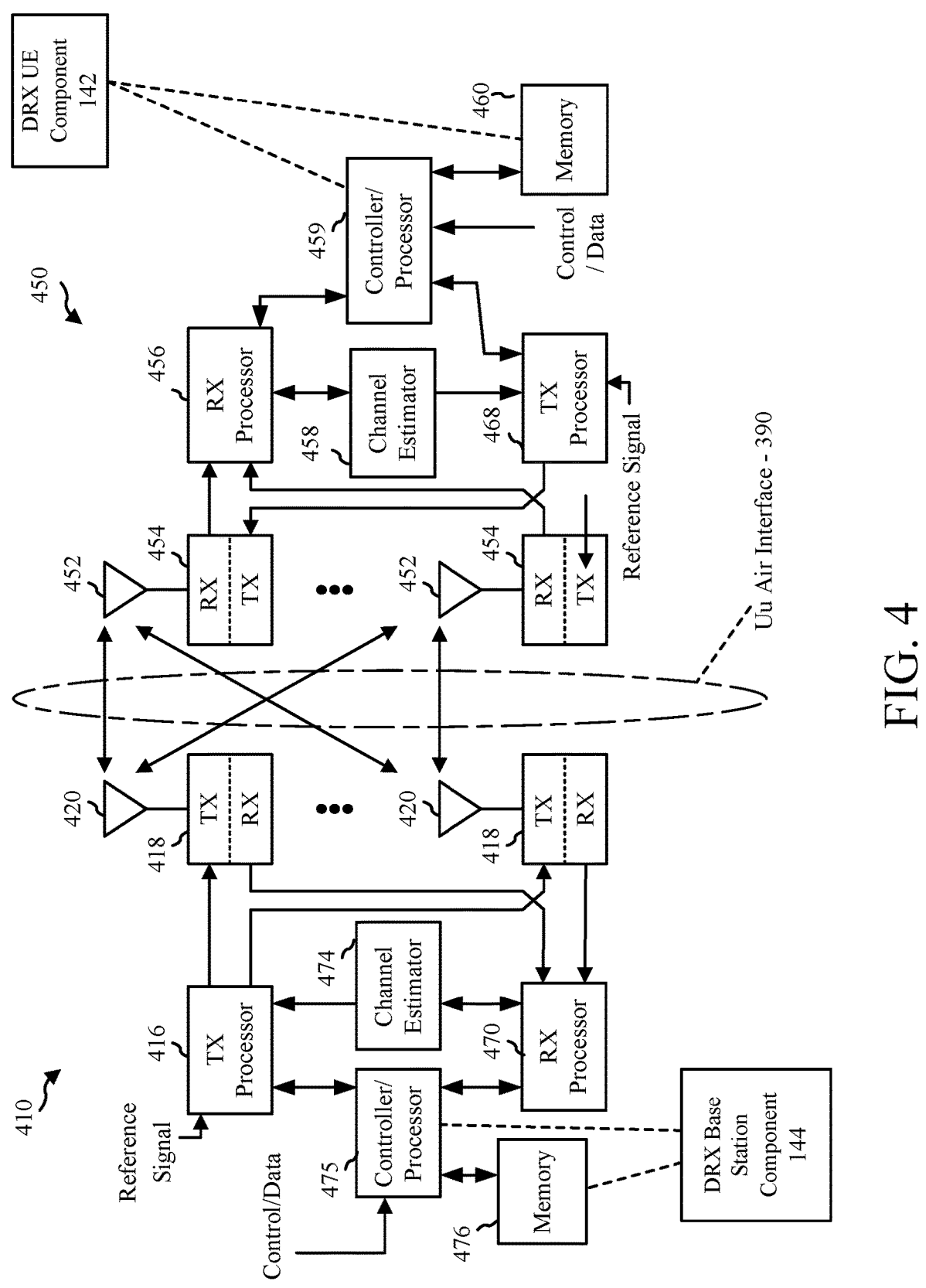
FIG. 4 is a diagram illustrating a base station and user equipment (UE) in an access network, in accordance with examples of the technology disclosed herein.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations. As described elsewhere herein, the interface between a UE 450 and a base station 410 can be referred to as a "Uu" interface 490.

In some examples of the technology disclosed herein, DRX UE component 142 can (in conjunction with controller/processor 459 and memory 460) receive a command from a base station 410 for a UE 450 to enter into a DRX cycle includes an L2 UL grant. The DRX UE component 142 can use the L2 UL grant to respond with acceptance, delayed acceptance, or rejection of the command. The DRX UE component 142 can determine its response to the command based on one of more of i) an amount of data in a transmit buffer of the UE 450, ii) a latency expectation for an amount of data to be transmitted from the UE 450, iii) a power status of the UE 450, and iv) a quality of service (QoS) based latency requirement of an application of the UE 450. Such a determination can be made using one or more of artificial intelligence or machine learning. The DRX UE component 142 can use L2 to signal to a base station 410 that the UE 450 has the above-described capabilities. The base station 410 also can use L2 to configure a capable UE 450 for operation using those capabilities.

In some examples of the technology disclosed herein, the DRX UE component 142 can request, of a base station 410 in connected RRC mode, to enter or to prohibit entry into a DRX cycle for MAC entity of the UE 450. After transmitting this request to the base station 410 and receiving a response accepting the request (e.g., a DRX Command MAC CE, a Long DRX Command MAC CE), the UE 450 can enter/prohibit in accordance with the received response from the base station 410.

In other examples of the technology disclosed herein, a DRX base station component 144 of base station 410 (in conjunction with controller/processor 475 and memory 476) can transmit a MAC CE command for a MAC entity of a UE 450 in RRC connected mode with the base station 410 to enter a DRX cycle, e.g., a DRX Command MAC CE or a Long DRX Command MAC CE. The transmitted command includes an L2 UL grant. In this case, DRX includes the ability for the UE 450 to transmit a response to the command via the L2 UL grant. The response is one of acceptance of the command, a delayed acceptance of the command, and rejection of the command. The base station 410 then operates in accordance with the response.

In some such examples, prior to transmitting the MAC CE command, the DRX base station component 144 can transmit, via RRC to the UE 450, a message configuring the UE 450 for DRX comprising the ability of the UE to transmit the response to the command via the L2 UL grant. In some such examples, prior to the transmitting the configuration command, the DRX base station component 144 can receive, from the UE 450 via RRC message, an indication of the ability of the UE 450 to transmit the response to the command via the L2 UL grant.

Referring to FIG. 5, and continuing to refer to prior figures for context, methods 500 for wireless communication are illustrated, in accordance with examples of the technology disclosed herein. Such methods 500 find use in the context of a UE in radio resource control (RRC) connected mode with a base station. In such methods, the UE receives, from the base station and prior to an expiration of a drx-InactivityTimer of a medium access control (MAC) entity of the UE, a MAC control element (CE) command for the MAC entity to enter a discontinuous reception (DRX) cycle, the command including an layer 2 (L2) uplink (UL) grant, wherein DRX comprises an ability for the UE to transmit a response to the command via the L2 UL grant, the response comprising one of acceptance of the command and rejection of the command—Block 510.

Figure 6:
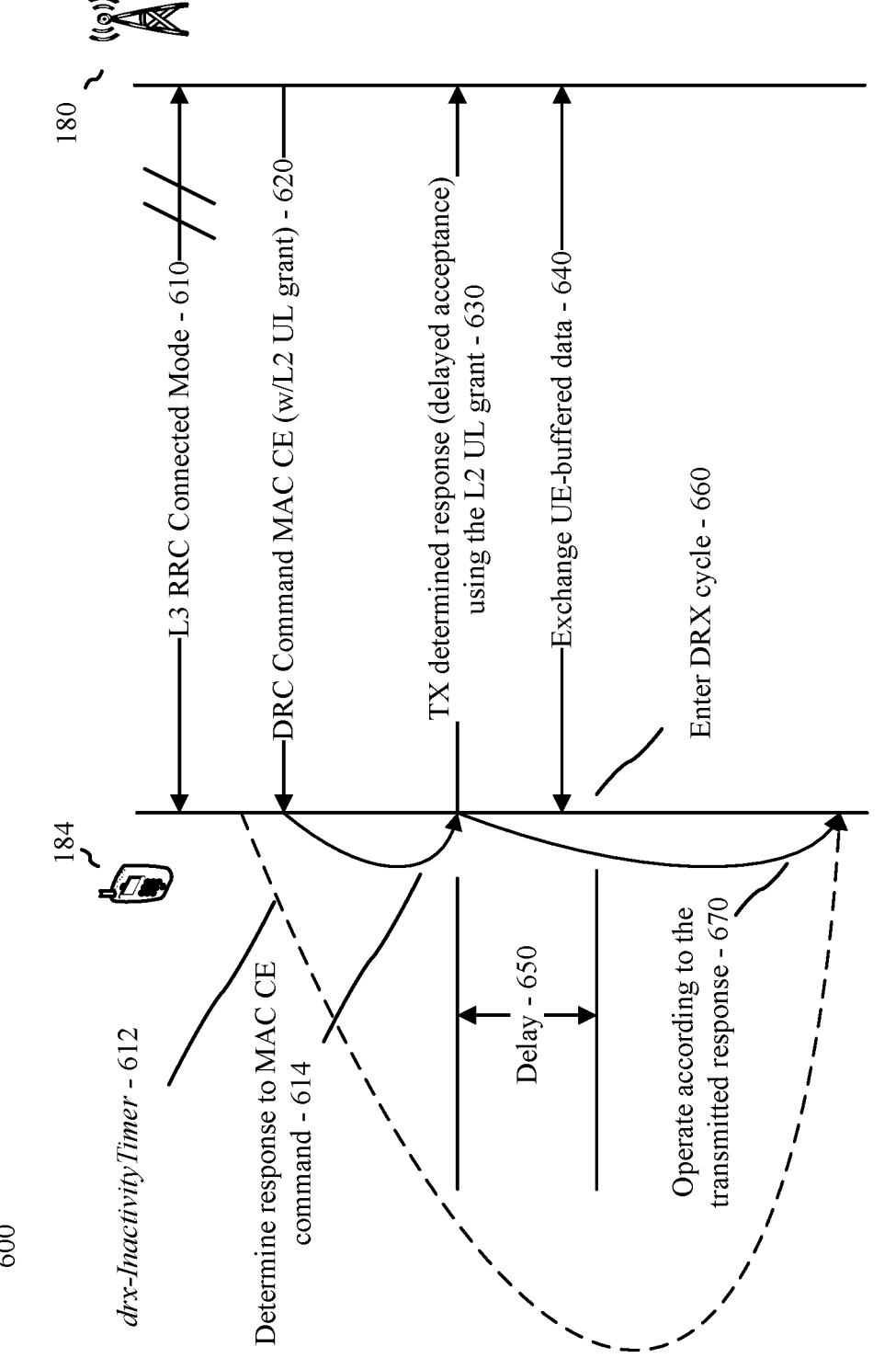
FIG. 6 illustrates a message flow, in accordance with examples of the technology disclosed herein.

Referring to FIG. 6, and continuing to refer to prior figures for context, a message flow 600 is illustrated, in accordance with examples of the technology disclosed herein. In message flow 600, the UE 184 establishes RRC connected mode with the base station 180 using messages 610. A drx-InactivityTimer 612 is running in the UE 184. The drx-InactivityTimer 612 is shown as a dashed line to indicate that if there is further DL PDCCH traffic, the timer may reset. The UE 184 receives a DRC Command MAC CE 620. The DRC Command MAC CE 620 includes an L2 UL grant. The L2 UL grant can be used by the UE 184 to accept, accept with delay, or reject the DRC Command MAC CE 620.

The UE determines the response to the received command—Block 520. In some examples, the UE determines the response based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE—Block 522. In some such examples, such determination is performed using one or more of artificial intelligence and machine learning.

In flow 600, the UE 184 has a low battery and no applications running other than a geolocation application that has a small amount of data to transmit. Based on its DRX configuration UE 184 and the latency requirements for the geolocation application, the UE 184 determines that the latency requirements for the geolocation application to report such data would not be met by waiting for the next set of slots that are actively monitored if it entered into the commanded DRX cycle immediately. Using machine learning, the UE 184 also determines that a change in data is expected before the next opportunity to receive from and transmit to the base station 180. Based on these factors, the UE 184 determines, at 614, to respond with delayed acceptance in order to transmit the geolocation application data present in the UE 184 transmit buffer before entering the DRX cycle.

The UE transmits the determined response to the base station using the L2 UL grant—Block 530. In flow 600, the UE 184 transmits message 630 containing the delayed acceptance using the L2 UL grant. The UE 184 then transmits the TX buffered data 640 during the delay 650. The UE 184 then operates in accordance with the transmitted response—Block 540. In flow 600, after delay 650 expires and absent other factors, the UE 184 enters the delayed-acceptance DRX cycle 670.

Referring to FIG. 7, and continuing to refer to prior figures for context, methods 700 for wireless communication are illustrated, in accordance with examples of the technology disclosed herein. Such methods 700 find use in the context of a UE in radio resource control RRC connected mode with a base station. In such methods 700, Block 510, Block, 520, Block 530, and Block 540 are performed as described above in connection with FIG. 5 and FIG. 6. In such methods 700 prior to receiving the command, the UE receives an L3 RRC message configuring the UE for DRX comprising the ability for the UE to transmit the response to the command via the L2 UL grant—Block 710.

Figure 8:
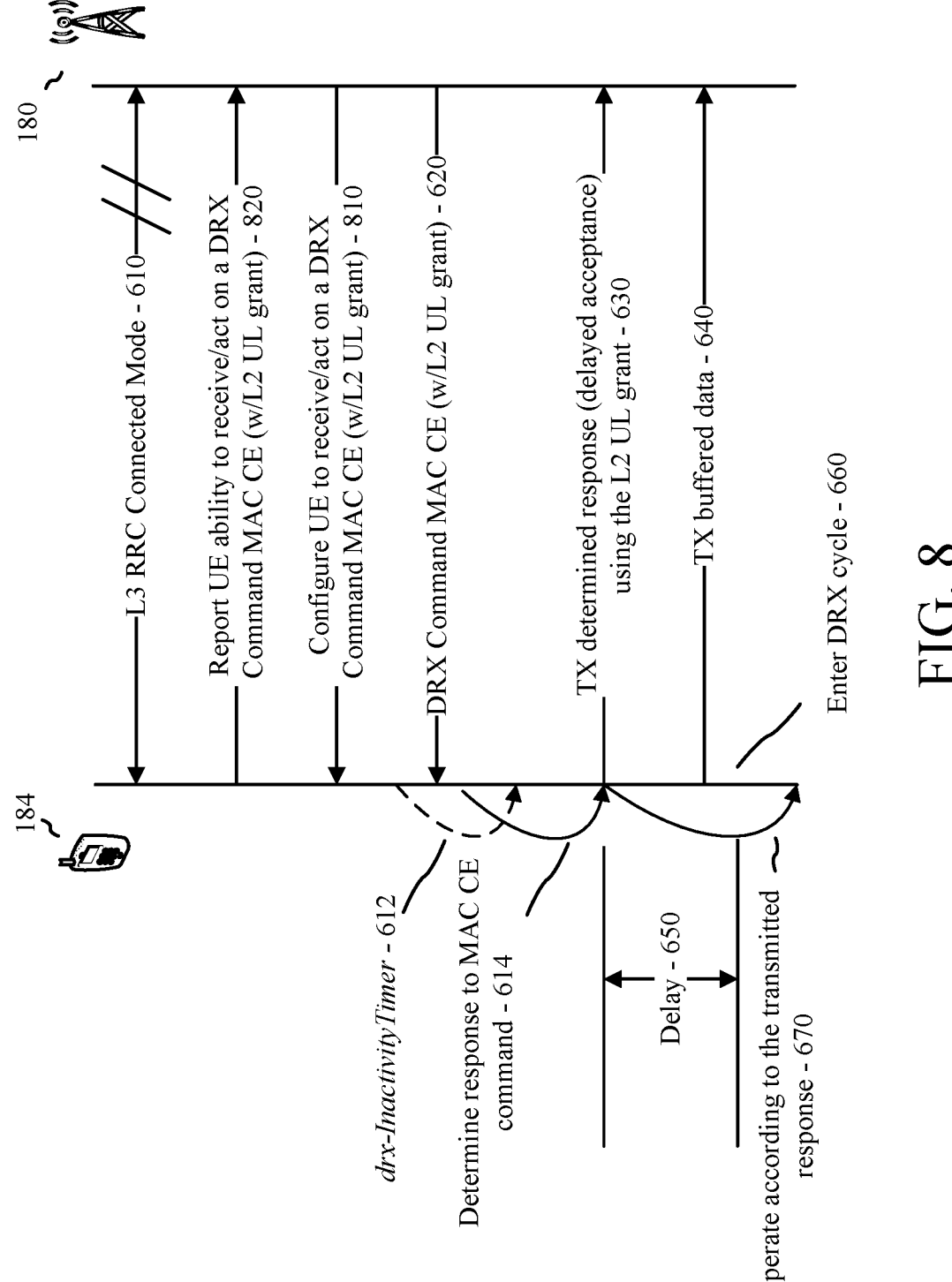
FIG. 8 illustrates a message flow, in accordance with examples of the technology disclosed herein.

Referring to FIG. 8, and continuing to refer to prior figures for context, a message flow 800 is illustrated, in accordance with examples of the technology disclosed herein. Each portion of the message flow 800 using reference label 6XX operates as described above in connection with FIG. 6. Prior to receiving the DRX Command MAC CE (w/L2 UL grant) 620 the UE 184, base station 180 configures the UE to receive and act on a DRX Command MAC CE with L2 UL grant using message(s) 810.

In some such methods 700, prior to the configuration of Block 710, the UE reports, to the base station via RRC message, the ability for the UE to transmit the response to the command via the L2 UL grant—Block 720. In message flow 800, the UE 184 report the ability to receive/act on a DRX Command MAC CE containing an L2UL grant (along with other commands that invoke DRX in the UE 184 and contain such UL grant) from the base station 180 using message(s) 820.

Referring to FIG. 9, and continuing to refer to prior figures for context, methods 900 for wireless communication are illustrated, in accordance with examples of the technology disclosed herein. Such methods 900 find use in the context of a UE in radio resource control RRC connected mode with a base station. In such methods a UE determines to request i) to enter, or ii) to prohibit, a DRX cycle for a MAC entity of the UE—Block 910. The request can include a request to enter a specific type of DRX cycle (e.g., regular or long) and a delay time.

Referring to FIG. 10, and continuing to refer to prior figures for context, a message flow 1000 is illustrated, in accordance with examples of the technology disclosed herein. In message flow 1000, UE 184 is in RRC connected mode with base station 180, as indicated by messages 610 and as described above. In message flow 1000, the UE 184 determines to request entry into a DRX cycle based on having no data in a transmit buffer of the UE 184, no latency expectation for an amount of data to be transmitted from the UE 184, a low power status of the UE 184, and no QoS based latency requirement of any applications executing of the UE 184.

The UE transmits the determined request to the base station—Block 920. In message flow 1000, the UE 184 transmits a request to enter a DRX cycle in message 1020. The request is for a regular DRX cycle with no delay. In this case, the UE 184 has already been configured for the ability to request to enter/prohibit entry into a DRX cycle for a MAC entity of the UE 184.

The UE receives, from the base station, a response to the transmitted request—Block 930. The response includes one or acceptance (e.g., a command to enter the DRX cycle), delayed acceptance, or rejection. In message flow 1000, the UE 184 receives DRX Command MAC CE in message 1030. There is no delay associated with the received DRX Command MAC CE. The UE operates according to the received response—Block 940. In message flow 1000, the UE 184 enters the DRX cycle that the UE 184 is configured for, as indicated at 1040 and operates in accordance with the transmitted response as shown at 1050.

From the perspective of the base station 180, methods of the technology disclosed herein proceed in a complementary manner to that describe above from the perspective of the UE 184. For example, in some methods, the base station 180, transmits, to a UE 184 in RRC connected mode with the base station 180 and prior to an expiration of a drx-InactivityTimer of a MAC entity of the UE 184, a MAC CE command (e.g., DRX Command MAC CE, Long DRX Command MAC CE) for the MAC entity to enter a DRX cycle—for example as shown in message 620 in message flow 600. The transmitted command includes an L2 UL grant. In such cases, DRX includes an ability for the UE 184 to transmit a response to the command via the L2 UL grant. The response is one of acceptance of the command, delayed acceptance of the command (optional), and rejection of the command—for example as message 630 in message flow 600. In some examples, prior to transmitting the MAC CE command, the base station 180 can transmit, via RRC to the UE 184, a message configuring the UE 184 for DRX comprising the ability of the UE 184 to transmit the response to the command via the L2 UL grant—as shown in message 810 of flow 800. In some such examples, prior to the second transmitting, the base station 180 receives, from the UE 184 via RRC message, an indication of the ability of the UE 184 to transmit the response to the command via the L2 UL grant—as shown in message 820 of message flow 800.

As examples of some methods from the perspective of the base station 180, the base station 180 can receive, from a UE 184 in RRC connected mode with the base station 180, a request i) to enter, or ii) to prohibit, a DRX cycle for a MAC entity of the UE 184—for example, as shown in message 1020 of message flow 1000. The base station 180 determines a response to the received request, the response comprising an acceptance, a delayed acceptance, or a rejection of the received request. In some examples, determining a response includes determining the response based on one or more of i) an amount of data in a transmit buffer of the base station 180, iii) a power status of the UE 184, and quality of service (QoS) based latency requirement of a UE 184 application, and iv) quality of service (QoS) based latency requirement of an application of the UE 184. In some such examples, the response can be determined using one or more of artificial intelligence and machine learning.

Referring to FIG. 11, and continuing to refer to prior figures for context, another representation of the UE 450 for wireless communication of FIG. 4 is shown, in accordance with examples of the technology disclosed herein. UE 340 includes DRX UE component 142, controller/processor 459, and memory 460, as described in conjunction with FIG. 4 above. The controller/processor 459 is coupled to the memory 460. The memory 460 including instructions executable by the controller/processor 459 to cause the UE 450 to perform the methods described herein.

DRX UE component 142 includes receiving component 142a. In some examples, the receiving component 142a receives, from a base station in RRC connected mode with the UE and prior to an expiration of a drx-InactivityTimer of a MAC entity of the UE, a MAC CE command for the MAC entity to enter a DRX cycle, the command including an L2 UL grant, wherein DRX comprises an ability for the UE to transmit a response to the command via the L2 UL grant, the response comprising one of acceptance of the command and rejection of the command. Accordingly, receiving component 142a may provide means for receives, from a base station in RRC connected mode with the UE and prior to an expiration of a drx-InactivityTimer of a MAC entity of the UE, a MAC CE command for the MAC entity to enter a DRX cycle, the command including an L2 UL grant, wherein DRX comprises an ability for the UE to transmit a response to the command via the L2 UL grant, the response comprising one of acceptance of the command and rejection of the command.

DRX UE component 142 includes determining component 142b. In some examples, the determining component 142b determines the response to the command. Accordingly, determining component 142b may provide means for determining the response to the command. In some examples, determining component 142b includes determining subcomponent 142b1. Determining subcomponent 142b1 determines the response based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE. Accordingly, determining subcomponent 142b1 provides means for determining the response based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE.

DRX UE component 142 includes transmitting component 142c. In some examples, the transmitting component 142c transmits, to the base station using the L2 UL grant, the determined response. Accordingly, transmitting component 142c may provide means for transmitting, to the base station using the L2 UL grant, the determined response.

DRX UE component 142 includes operating component 142d. In some examples, the operating component 142d operates according to the transmitted response. Accordingly, operating component 142d may provide means for operating according to the transmitted response.

DRX UE component 142 can include configuring component 142e. In some examples, the configuring component 142e receives, via radio resource control (RRC) and prior to the first receiving command, a message configuring the UE for DRX comprising the ability for the UE to transmit the response to the command via the L2 UL grant. Accordingly, configuring component 142e may provide means for receiving, via radio resource control (RRC), a message configuring the UE for DRX comprising the ability for the UE to transmit the response to the command via the L2 UL grant. The UE configures itself according to the received message.

DRX UE component 142 can include reporting component 142f. In some examples, the reporting component 142f reports to the base station, prior to the configuring and via RRC message, reporting, the ability for the UE to transmit the response to the command via the L2 UL grant. Accordingly, reporting component 142f may provide means for reporting to the base station, prior to the configuring and via RRC message, reporting, the ability for the UE to transmit the response to the command via the L2 UL grant.

DRX UE component 142 includes second determining component 142g. In some examples, the second determining component 142g determines, while the UE is in radio resource control (RRC) connected mode with a base station, to request i) to enter, or ii) to prohibit, a discontinuous reception (DRX) cycle for a medium access control (MAC) entity of the UE. Accordingly, second determining component 142g may provide means for determining, while the UE is in radio resource control (RRC) connected mode with a base station, to request i) to enter, or ii) to prohibit, a discontinuous reception (DRX) cycle for a medium access control (MAC) entity of the UE.

In some examples, second determining component 142g includes second determining subcomponent 142g1. Determining subcomponent 142g1 determines to request based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE. Accordingly, determining subcomponent 142g1 provides means for determining to request based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE.

DRX UE component 142 includes second transmitting component 142h. In some examples, the second transmitting component 142h transmits, to the base station a request based on the determination. Accordingly, second transmitting component 142h may provide means for transmitting, to the base station a request based on the determination.

DRX UE component 142 includes second receiving component 142i. In some examples, the second receiving component 142i receives, from the base station, a response to the transmitted request, the response comprising an acceptance or a rejection of the transmitted request. Accordingly, second receiving component 142i may provide means for receiving, from the base station, a response to the transmitted request, the response comprising an acceptance or a rejection of the transmitted request.

DRX UE component 142 includes second operating component 142j. In some examples, the second operating component 142j operates the UE in accordance with the received response. Accordingly, second operating component 142j may provide means for operating the UE in accordance with the received response.

Referring to FIG. 12, and continuing to refer to prior figures for context, another representation of the base station 410 for wireless communication of FIG. 4 is shown, in accordance with examples of the technology disclosed herein. Base station 410 (e.g., a gNB, a TRP) includes DRX base station component 144, controller/processor 475, and memory 476, as described in conjunction with FIG. 4 above. The controller/processor 475 is coupled to the memory 476. The memory 476 including instructions executable by the controller/processor 475 to cause the base station 410 to perform the methods described herein.

DRX base station component 144 includes transmitting component 144a. In some examples, the transmitting component 144a transmits, to a UE in RRC connected mode with the base station and prior to an expiration of a drx-InactivityTimer of a MAC entity of the UE, a MAC CE command for the MAC entity to enter a DRX cycle, the transmitted command including an L2 UL grant, wherein DRX comprises an ability for the UE to transmit a response to the command via the L2 UL grant, the response comprising one of acceptance of the command and rejection of the command. Accordingly, transmitting component 144a may provide means for transmitting, to a UE in RRC connected mode with the base station and prior to an expiration of a drx-Inactivity Timer of a MAC entity of the UE, a MAC CE command for the MAC entity to enter a DRX cycle, the transmitted command including an L2 UL grant, wherein DRX comprises an ability for the UE to transmit a response to the command via the L2 UL grant, the response comprising one of acceptance of the command and rejection of the command.

DRX base station component 144 includes receiving component 144*b*. In some examples, the receiving component 144*b* receives, from the UE via the L2 UL grant, the response. Accordingly, receiving component 144*b* may provide means for receiving, from the UE via the L2 UL grant, the response. DRX base station component 144 includes operating component 144*c*. In some examples, the operating component 144*c* operates the UE according to the received response. Accordingly, operating component 144*c* may provide means for operating the UE according to the received response.

In some examples, DRX base station component 144 includes configuring component 144*d*. In some examples, the configuring component 144*d*, prior to transmitting the MAC CE command, transmits, via radio resource control (RRC) to the UE, a message configuring the UE for DRX comprising the ability of the UE to transmit the response to the command via the L2 UL grant. Accordingly, configuring component 144*d* may provide means for, prior to transmitting the MAC CE command, transmitting, via radio resource control (RRC) to the UE, a message configuring the UE for DRX comprising the ability of the UE to transmit the response to the command via the L2 UL grant.

DRX base station component 144 includes second receiving component 144*e*. In some examples, the second receiving component 144*e* prior to the configuring, receives, from the UE via RRC message, an indication of the ability of the UE to transmit the response to the command via the L2 UL grant. Accordingly, second receiving component 144*e* may provide means for prior to the configuring, receiving, from the UE via RRC message, an indication of the ability of the UE to transmit the response to the command via the L2 UL grant.

DRX base station component 144 includes third receiving component 144*f*. In some examples, the third receiving component 144*f* receives, from a UE in radio resource control (RRC) connected mode with the base station, a request i) to enter, or ii) to prohibit, a discontinuous reception (DRX) cycle for a medium access control (MAC) entity of the UE. Accordingly, third receiving component 144*f* may provide means for receiving, from a UE in radio resource control (RRC) connected mode with the base station, a request i) to enter, or ii) to prohibit, a discontinuous reception (DRX) cycle for a medium access control (MAC) entity of the UE.

DRX base station component 144 includes determining component 144*g*. In some examples, the determining component 144*g* determines a response to the received request, the response comprising an acceptance or a rejection of the received request. Accordingly, determining component 144*g* may provide means for determining a response to the received request, the response comprising an acceptance or a rejection of the received request. In some examples, determining component 144*g* comprises determining subcomponent 144*g*1. Determining subcomponent 144*g*1 determines the response based on one or more of i) an amount of data in a transmit buffer of the base station, iii) a power status of the UE, and quality of service (QoS) based latency requirement of a UE application, and iv) quality of service (QoS) based latency requirement of an application of the UE. Accordingly, determining subcomponent 144*g*1 may provide means for determining the response based on one or more of i) an amount of data in a transmit buffer of the base station, iii) a power status of the UE, and quality of service (QoS) based latency requirement of a UE application, and iv) quality of service (QoS) based latency requirement of an application of the UE.

DRX base station component 144 includes second transmitting component 144*h*. In some examples, the second transmitting component 144*h* transmit the determined response. Accordingly, second transmitting component 144*h* may provide means for transmitting the determined response. DRX base station component 144 includes second operating component 144*i*. In some examples, the second operating component 144*i* operates the UE according to the transmitted response. Accordingly, second operating component 144*i* may provide means for operating the UE according to the transmitted response.

The following examples are illustrative only and aspects thereof may be combined with aspects of other embodiments or teaching described herein, without limitation. The technology disclosed herein includes method, apparatus, and computer-readable media including instructions for wireless communication. Such technology finds use in the context of a UE capable of both half-duplex mode communication and full-duplex mode communication.

In Example 1, the techniques, devices, and non-transitory media containing instructions described herein relate to a wireless communication method in a user equipment (UE), including: receiving, from a base station in radio resource control (RRC) connected mode with the UE and prior to an expiration of a drx-InactivityTimer of a medium access control (MAC) entity of the UE, a MAC control element (CE) command for the MAC entity to enter a discontinuous reception (DRX) cycle, the command including an layer 2 (L2) uplink (UL) grant, wherein DRX includes an ability for the UE to transmit a response to the command via the L2 UL grant, the response including one of acceptance of the command and rejection of the command; determining the response to the command; transmitting, to the base station using the L2 UL grant, the determined response; and operating according to the transmitted response.

Example 2 includes Example 1 wherein the response further includes a delayed acceptance of the command. Example 3 includes the prior Examples wherein the command is one of a DRX Command MAC CE and a Long DRX Command MAC CE. Example 4 includes the prior Examples, wherein determining the response to the command includes determining the response based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE. Example 5 includes the prior Examples, wherein determining the response to the command includes determining the response using on one or more artificial intelligence and machine learning. Example 6 includes the prior Examples, further including, prior to receiving the command, second receiving, via radio resource control (RRC), a message configuring the UE for DRX including the ability for the UE to transmit the response to the command via the L2 UL grant. Example 7 includes the prior Examples, further including, prior to the second receiving, reporting, to the base station via RRC message, the ability for the UE to transmit the response to the command via the L2 UL grant. Example 8 includes the prior Examples, including: determining, while the UE is in radio resource control (RRC) connected mode with a base station, to request i) to enter, or ii) to prohibit, a discontinuous reception (DRX) cycle for a medium access control (MAC) entity of the UE; transmitting, to the base station a request based on the determination; receiving, from the base station, a response to the transmitted request, the response including an acceptance or a rejection of the transmitted request; and operating according to the received response. Example 9 includes the prior Examples, wherein determining to request includes determining to request based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE. Example 10 includes the prior Examples, wherein determining to request includes determining to request using on one or more artificial intelligence and machine learning.

In Example 11, the techniques, devices, and non-transitory media containing instructions described herein relate to a wireless communication method in a base station, including: transmitting, to a UE in radio resource control (RRC) connected mode with the base station and prior to an expiration of a drx-InactivityTimer of a medium access control (MAC) entity of the UE, a MAC control element (CE) command for the MAC entity to enter a discontinuous reception (DRX) cycle, the transmitted command including a layer 2 (L2) uplink (UL) grant, wherein DRX includes an ability for the UE to transmit a response to the command via the L2 UL grant, the response including one of acceptance of the command and rejection of the command; receiving, from the UE via the L2 UL grant, the response; and operating according to the received response.

Example 12 includes Example 11, wherein the response further includes a delayed acceptance of the command. Example 13 includes Example 11 and later, wherein the command is one of a DRX Command MAC CE and a Long DRX Command MAC CE. Example 14 includes Example 11 and later, further including, prior to transmitting the MAC CE command, second transmitting, via radio resource control (RRC) to the UE, a message configuring the UE for DRX including the ability of the UE to transmit the response to the command via the L2 UL grant. Example 15 includes Example 11 and later, further including, prior to the second transmitting, receiving, from the UE via RRC message, an indication of the ability of the UE to transmit the response to the command via the L2 UL grant. Example 16 includes Example 11 and later, including: receiving, from a UE in radio resource control (RRC) connected mode with the base station, a request i) to enter, or ii) to prohibit, a discontinuous reception (DRX) cycle for a medium access control (MAC) entity of the UE; determining a response to the received request, the response including an acceptance or a rejection of the received request; transmitting the determined response; and operating according to the transmitted response. Example 17 includes Example 11 and later, wherein determining the response to the request includes determining the response based on one or more of i) an amount of data in a transmit buffer of the base station, iii) a power status of the UE, and quality of service (QoS) based latency requirement of a UE application, and iv) quality of service (QoS) based latency requirement of an application of the UE. Example 18 includes Example 11 and later, wherein determining the response to the request includes determining the response using on one or more artificial intelligence and machine learning.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:
1. A wireless communication method in a user equipment (UE), comprising:
   receiving, from a base station in radio resource control (RRC) connected mode with the UE and prior to an expiration of a drx-InactivityTimer of a medium access control (MAC) entity of the UE, a MAC control element (CE) command for the MAC entity to enter a discontinuous reception (DRX) cycle, the command including an layer 2 (L2) uplink (UL) grant, wherein DRX comprises an ability for the UE to transmit a response to the command via the L2 UL grant, the response comprising one of acceptance of the command and rejection of the command;
   determining the response to the command;
   transmitting, to the base station using the L2 UL grant, the determined response; and
   operating according to the transmitted response.
2. The method of claim 1, wherein the response further comprises a delayed acceptance of the command.
3. The method of claim 1, wherein the command is one of a DRX Command MAC CE and a Long DRX Command MAC CE.
4. The method of claim 1, wherein determining the response to the command comprises determining the response based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE.

5. The method of claim 4, wherein determining the response to the command comprises determining the response using on one or more artificial intelligence and machine learning.

6. The method of claim 1, further comprising, prior to receiving the command, second receiving, via radio resource control (RRC), a message configuring the UE for DRX comprising the ability for the UE to transmit the response to the command via the L2 UL grant.

7. The method of claim 6, further comprising, prior to the second receiving, reporting, to the base station via RRC message, the ability for the UE to transmit the response to the command via the L2 UL grant.

8. A wireless communication method in a user equipment (UE), comprising:
    determining, while the UE is in radio resource control (RRC) connected mode with a base station, to request i) to enter, or ii) to prohibit, a discontinuous reception (DRX) cycle for a medium access control (MAC) entity of the UE;
    transmitting, to the base station a request based on the determination;
    receiving, from the base station, a response to the trans-mitted request, the response comprising an acceptance or a rejection of the transmitted request; and
    operating according to the received response.

9. The method of claim 8, wherein determining to request comprises determining to request based on one or more of i) an amount of data in a transmit buffer of the UE, ii) a latency expectation for an amount of data to be transmitted from the UE, iii) a power status of the UE, and iv) a quality of service (QoS) based latency requirement of an application of the UE.

10. The method of claim 9, wherein determining to request comprises determining to request using on one or more artificial intelligence and machine learning.

11. A wireless communication method in a base station, comprising:
    transmitting, to a UE in radio resource control (RRC) connected mode with the base station and prior to an expiration of a drx-InactivityTimer of a medium access control (MAC) entity of the UE, a MAC control element (CE) command for the MAC entity to enter a discontinuous reception (DRX) cycle, the transmitted command including a layer 2 (L2) uplink (UL) grant, wherein DRX comprises an ability for the UE to transmit a response to the command via the L2 UL grant, the response comprising one of acceptance of the command and rejection of the command;
    receiving, from the UE via the L2 UL grant, the response; and
    operating according to the received response.

12. The method of claim 11, wherein the response further comprises a delayed acceptance of the command.

13. The method of claim 11, wherein the command is one of a DRX Command MAC CE and a Long DRX Command MAC CE.

14. The method of claim 11, further comprising, prior to transmitting the MAC CE command, second transmitting, via radio resource control (RRC) to the UE, a message configuring the UE for DRX comprising the ability of the UE to transmit the response to the command via the L2 UL grant.

15. The method of claim 14, further comprising, prior to the second transmitting, receiving, from the UE via RRC message, an indication of the ability of the UE to transmit the response to the command via the L2 UL grant.

16. A wireless communication method in a base station, comprising:
    receiving, from a UE in radio resource control (RRC) connected mode with the base station, a request i) to enter, or ii) to prohibit, a discontinuous reception (DRX) cycle for a medium access control (MAC) entity of the UE;
    determining a response to the received request, the response comprising an acceptance or a rejection of the received request;
    transmitting the determined response; and
    operating according to the transmitted response.

17. The method of claim 16, wherein determining the response to the request comprises determining the response based on one or more of i) an amount of data in a transmit buffer of the base station, iii) a power status of the UE, and quality of service (QoS) based latency requirement of a UE application, and iv) quality of service (QoS) based latency requirement of an application of the UE.

18. The method of claim 17, wherein determining the response to the request comprises determining the response using on one or more artificial intelligence and machine learning.

19. A user equipment (UE) comprising:
    a memory; and
    at least one processor coupled to the memory, the memory including instructions executable by the at least one processor to cause the UE to:
        receive, from a base station in radio resource control (RRC) connected mode with the UE and prior to an expiration of a drx-InactivityTimer of a medium access control (MAC) entity of the UE, a MAC control element (CE) command for the MAC entity to enter a discontinuous reception (DRX) cycle, the command including an layer 2 (L2) uplink (UL) grant, wherein DRX comprises an ability for the UE to transmit a response to the command via the L2 UL grant, the response comprising one of acceptance of the command and rejection of the command;
        determine the response to the command;
        transmit, to the base station using the L2 UL grant, the determined response; and
        operate according to the transmitted response.

20. The UE of claim 19, wherein the response further comprises a delayed acceptance of the command.

21. The UE of claim 19, wherein the command is one of a DRX Command MAC CE and a Long DRX Command MAC CE.

22. A base station comprising:
    a memory; and
    at least one processor coupled to the memory, the memory including instructions executable by the at least one processor to cause the base station to:
        transmit, to a UE in radio resource control (RRC) connected mode with the base station and prior to an expiration of a drx-InactivityTimer of a medium access control (MAC) entity of the UE, a MAC control element (CE) command for the MAC entity to enter a discontinuous reception (DRX) cycle, the transmitted command including a layer 2 (L2) uplink (UL) grant, wherein DRX comprises an ability for the UE to transmit a response to the command via the L2 UL grant, the response comprising one of accep-tance of the command and rejection of the command;

receive, from the UE via the L2 UL grant, the response; and operate according to the received response.

23. The base station of claim 22, wherein the response further comprises a delayed acceptance of the command.

24. The base station of claim 22, wherein the command is one of a DRX Command MAC CE and a Long DRX Command MAC CE.

25. A non-transitory computer-readable medium storing computer executable code, the code when executed by at least one processor of a user equipment (UE) causes the UE to:

receive, from a base station in radio resource control (RRC) connected mode with the UE and prior to an expiration of a drx-InactivityTimer of a medium access control (MAC) entity of the UE, a MAC control element (CE) command for the MAC entity to enter a discontinuous reception (DRX) cycle, the command including an layer 2 (L2) uplink (UL) grant, wherein DRX comprises an ability for the UE to transmit a response to the command via the L2 UL grant, the response comprising one of acceptance of the command and rejection of the command;

determine the response to the command;

transmit, to the base station using the L2 UL grant, the determined response; and operate according to the transmitted response.

26. The medium of claim 25, wherein the response further comprises a delayed acceptance of the command.

27. The medium of claim 25, wherein the command is one of a DRX Command MAC CE and a Long DRX Command MAC CE.

28. A non-transitory computer-readable medium storing computer executable code, the code when executed by at least one processor of a base station causes the base station to:

transmit, to a UE in radio resource control (RRC) connected mode with the base station and prior to an expiration of a drx-InactivityTimer of a medium access control (MAC) entity of the UE, a MAC control element (CE) command for the MAC entity to enter a discontinuous reception (DRX) cycle, the transmitted command including a layer 2 (L2) uplink (UL) grant, wherein DRX comprises an ability for the UE to transmit a response to the command via the L2 UL grant, the response comprising one of acceptance of the command and rejection of the command;

receive, from the UE via the L2 UL grant, the response; and operate according to the received response.

29. The base station of claim 28, wherein the response further comprises a delayed acceptance of the command.

30. The base station of claim 28, wherein the command is one of a DRX Command MAC CE and a Long DRX Command MAC CE.

* * * * *